April 3, 1928.

L. J. BROWN

SAFETY DEVICE FOR BRAKE BEAMS

Filed April 7, 1925

1,664,538

Inventor
Lloyd J. Brown
By James S. Clarkson
Attorney

Patented Apr. 3, 1928.

1,664,538

UNITED STATES PATENT OFFICE.

LLOYD J. BROWN, OF EVANSTON, ILLINOIS, ASSIGNOR TO E. PAYSON SMITH, OF SPRINGFIELD, ILLINOIS.

SAFETY DEVICE FOR BRAKE BEAMS.

Application filed April 7, 1925. Serial No. 21,327.

This invention relates to improvements in safety devices for railroad rolling stock including locomotives, generally, but more particularly for brake beams and the like.

The primary object of my invention is to provide a safety device which can be applied and detached without removing the brake pin from normal operative applied position.

A further object of my invention is to provide a device of this character that is simple, cheap to manufacture, but very efficient.

Car repairers and car builders at times fail to spread the cotter keys which are commonly used to lock the pins for brake levers, brake hangers, and brake fulcrums; and in other locations where pins are used. Again cotter keys frequently fail in service by breaking, either cause permits the pins to work out whereupon the brake riggings fall to the track which is the cause of many railroad wrecks.

If the brake rigging falls the air brake mechanism is out of service rendering the brakes inoperative. In addition to the loss of braking power on the car, the United States Safety Appliance Regulations require the brake to be in good braking condition and they attach a penalty defect to cars found in this condition and the fines levied by the commission amount during the year to a considerable sum against a railroad.

Among other advantages resulting from my invention may be mentioned the fact that where my device is used a shorter brake pin may be used than where a cotter pin is used, besides which it is not necessary to drill a cotter pin hole through the pin. Some railroads prefer to use the usual length of brake pin and also the cotter pin, but this does not prevent the use of my improved safety device.

My invention consists of a safety device which can be applied and detached without disturbing the normal and operative position of the parts.

Figure 1:
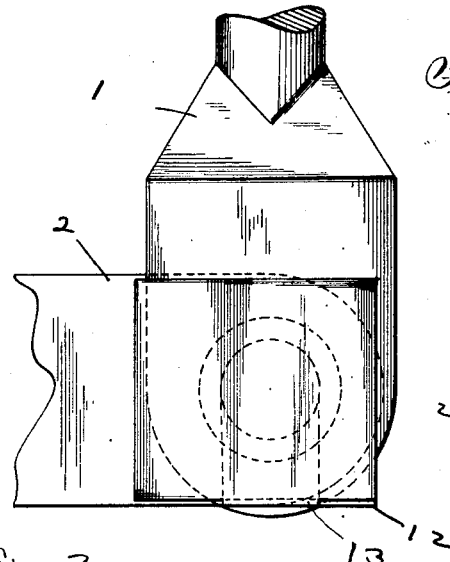
Figure 1 is a top plan view of portions of a connection rod and a brake beam lever, with my safety device applied.

The reference numeral 1 designates a connection rod and 2 an end of a brake lever, the connection rod having forked ends 3 and 4 as is usual, between which the lever 2 is secured by means of the pin 5, said pin having a head 6 and a cotter pin opening 7.

My improved safety device comprises a substantially U-shaped member having substantially parallel arms 8 and 9 which are spaced from each other by the spacing member 10. The arm 9 is provided with a recess 11 opening from one side edge thereof which recess is adapted to receive the pin 5 when the parts are in the assembled position shown in Figures 1 and 2. 12 is a flange or stop extending upwardly from the side edge of the arm 9 and positioned between the recess 11 and the free end of the arm 9. The arm 8 is provided with a depending flange which, when the parts are in assembled position bridges the outer end of the recess 11, thereby closing said recess and preventing the safety device from working off of and out of engagement with the pin 5 as will be readily understood.

Figure 4:
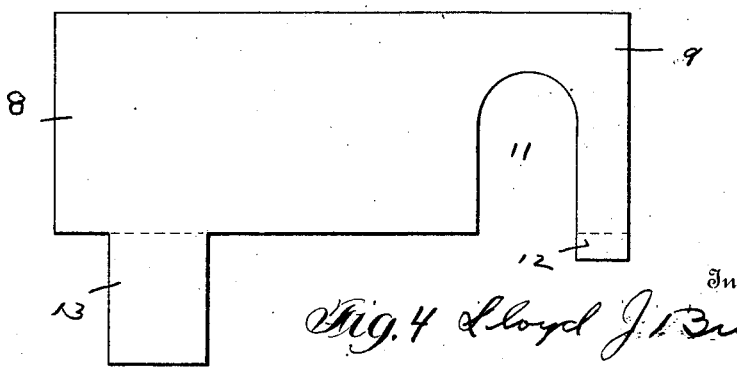
Figure 4 is a plan view of the blank from which my safety device is made.

The blank from which my improved safety device is formed is illustrated in Figure 4 wherein it is shown as a flat body with the side projections which are bent up to form the flange 12 and the flange 13.

Figure 2:
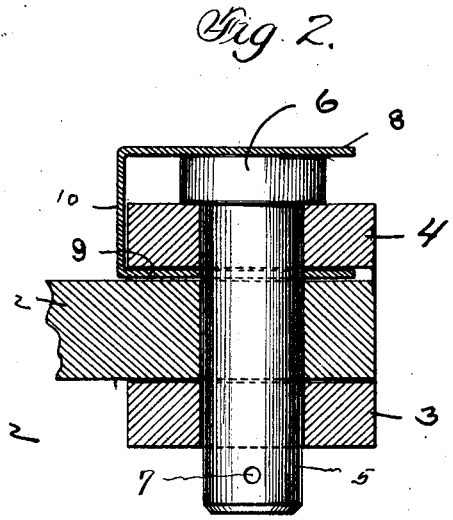
Figure 2 is a sectional view of the same.
Figure 3:
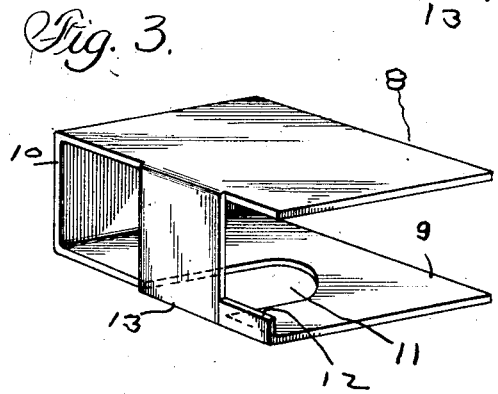
Figure 3 is a perspective view of my improved safety device.

After the connection rod and brake lever hanger are arranged as shown in Figures 1 and 2 with the openings of each in alinement the pin 5 is passed through said openings and the parts thus secured together. When the parts are in this position the arm 9 of my improved safety device is slipped between the hanger 2 and the forked end 4 until the pin 5 is within the recess 11, whereupon the flange 12 is struck up by a hammer blow to the position shown in Figures 1 and 3 and the flange 13 is bent by a hammer blow to the position shown in Figures 1 and 3 so that with the parts in the position described, it is impossible for the safety device to become disconnected from its operative position as will be readily understood by those skilled in the art.

Figure 5:
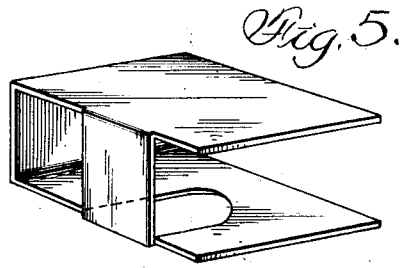
Figure 5 is another embodiment of my invention.

As shown in Figure 5, I may omit the flange 12 without impairing the efficiency of my device. In fact there are locations in which my device will be used where the flange 12 cannot be used, thus it will be understood that my device is not dependent upon this flange 12.

What I claim is:

1. A blank for a safety device for brake beams comprising a flat plate body having a recess extending inwardly from one side edge, and two flanges of different length projecting beyond the body line from the same side edge in which the recess is formed.

2. A safety device of the character described comprising two arms, a spacing member integrally connecting said arms at one end, there being a recess in one of said arms opening on the side edge of such arm, a flange depending from the other arm adapted to close the opening of said recess, and a flange on the other of said arms at the side edge thereof to one side of the recess.

3. A safety device of the character described comprising two arms, a spacing member integrally connecting said arms at one end, there being a recess in one of said arms opening on the side edge of such arm, a flange depending from the other arm adapted to close the opening of said recess, and a flange on the other of said arms at the side edge thereof between the end of the arm and said recess.

In testimony whereof I affix my signature.

LLOYD J. BROWN.